US010168111B2

(12) United States Patent
Al-Otaibi

(10) Patent No.: US 10,168,111 B2
(45) Date of Patent: Jan. 1, 2019

(54) REPLACEMENT TUBE PLUG FOR HEAT EXCHANGER

(71) Applicant: Saudi Arabian Oil Company, Dhahran (SA)

(72) Inventor: Dhawi A. Al-Otaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 14/824,286

(22) Filed: Aug. 12, 2015

(65) Prior Publication Data

US 2017/0045311 A1    Feb. 16, 2017

(51) Int. Cl.
| F28F 1/06 | (2006.01) |
| F28F 11/00 | (2006.01) |
| F16L 55/11 | (2006.01) |
| F28F 11/02 | (2006.01) |
| B23P 15/26 | (2006.01) |

(52) U.S. Cl.
CPC ............... *F28F 11/00* (2013.01); *B23P 15/26* (2013.01); *F16L 55/11* (2013.01); *F28F 11/02* (2013.01); *F28F 2220/00* (2013.01)

(58) Field of Classification Search
CPC ........ F28F 11/00; F28F 11/02; F28F 2220/00; B23P 15/26; F16L 55/11; B05B 1/04
USPC .......................................................... 165/76
See application file for complete search history.

(56) References Cited

U.S. PATENT DOCUMENTS

| 3,240,379 A | 3/1966 | Bremmer |
| 3,434,743 A | 3/1969 | Boeker |
| 3,472,301 A | 10/1969 | Pearce, Jr. |
| 4,114,654 A * | 9/1978 | Richardson ............. F16L 13/11 122/364 |
| 5,249,899 A | 10/1993 | Wilson |
| 6,588,999 B2 | 7/2003 | Kubler |
| 6,604,899 B2 | 8/2003 | Kubler |
| 6,896,462 B2 | 5/2005 | Stevenson |
| 6,902,366 B2 | 6/2005 | Ducker |
| 8,439,220 B2 | 5/2013 | Norman |
| 2004/0109738 A1 | 6/2004 | Ducker |
| 2012/0305032 A1* | 12/2012 | O'Donnell ................ B05B 1/04 134/34 |

FOREIGN PATENT DOCUMENTS

JP        5087488 A      4/1933

OTHER PUBLICATIONS

International Search Report and Written Opinion dated Nov. 8, 2016.

* cited by examiner

*Primary Examiner* — Davis Hwu
(74) *Attorney, Agent, or Firm* — Abelman, Frayne & Schwab

(57) ABSTRACT

A replacement tube plug for sealing the threaded junction between a tube plug and a bore in a plugsheet, the tube plug including a body part having proximal and distal ends, an outer threaded surface, a central bore open at the proximal end and at least one branch bore extending from and in fluid communication with the central bore and extending radially to the outer surface of the body part, and a method for delivering fluid sealant via the central and branches to the threaded junction of the tube plug and the plugsheet.

10 Claims, 5 Drawing Sheets

Figure 1:
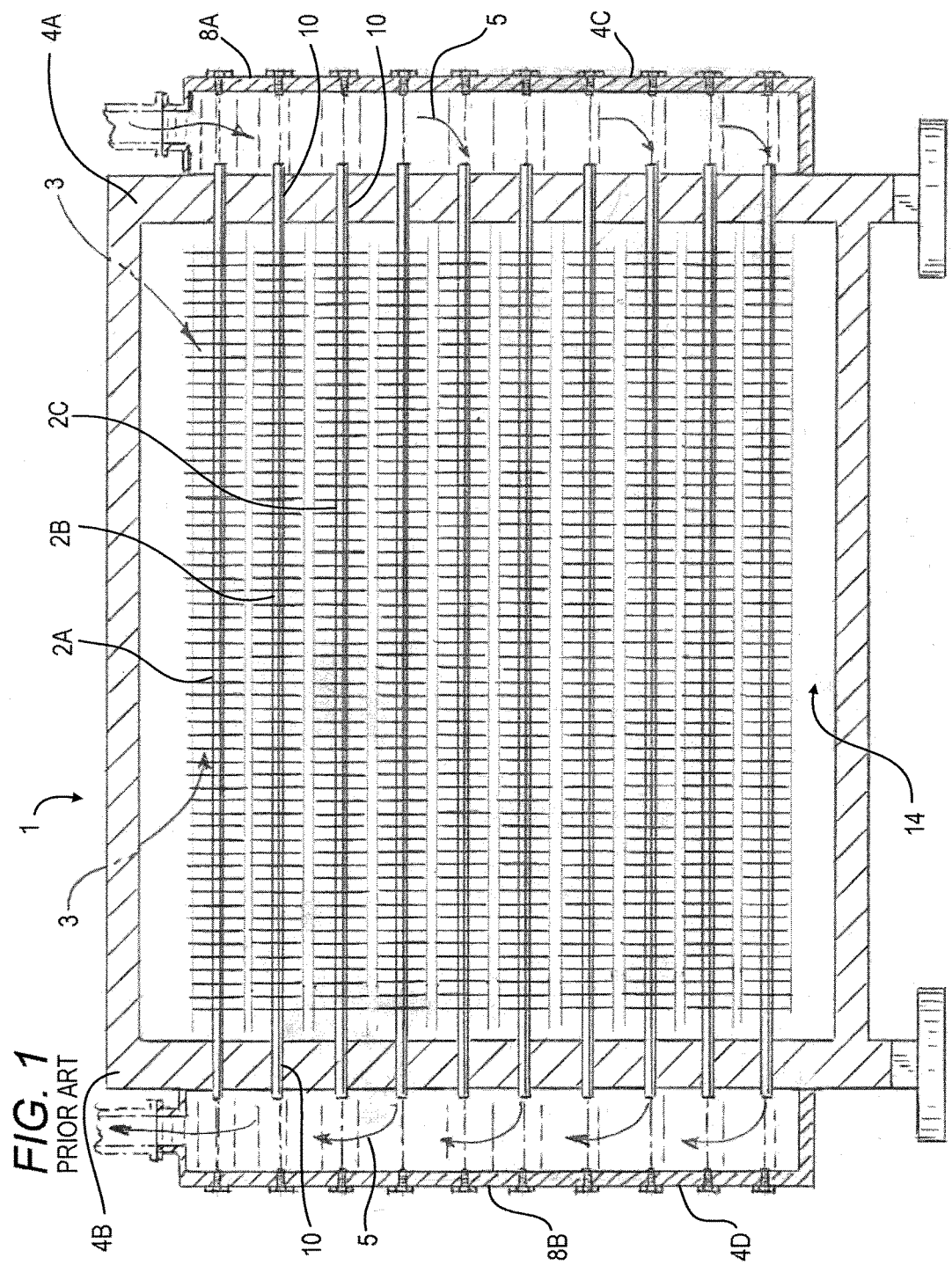

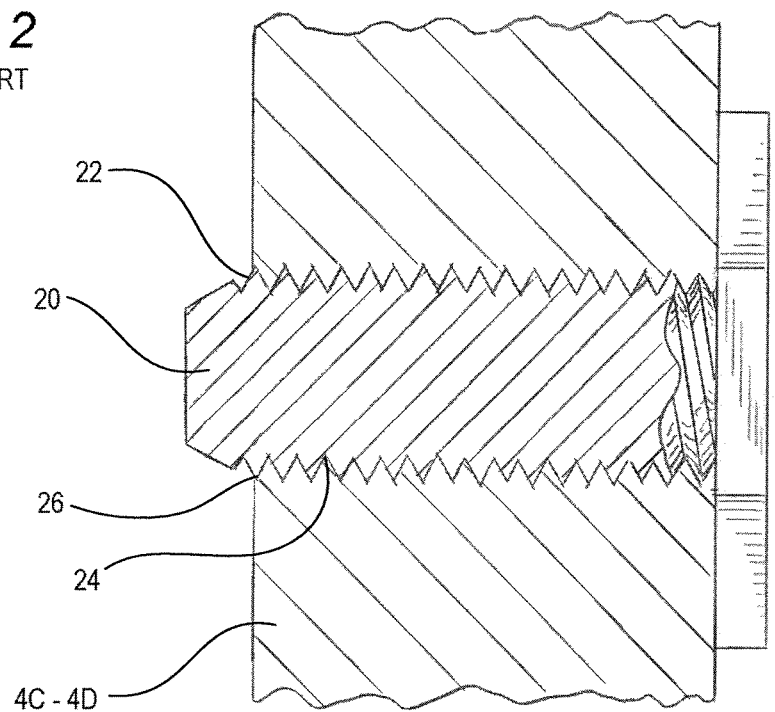
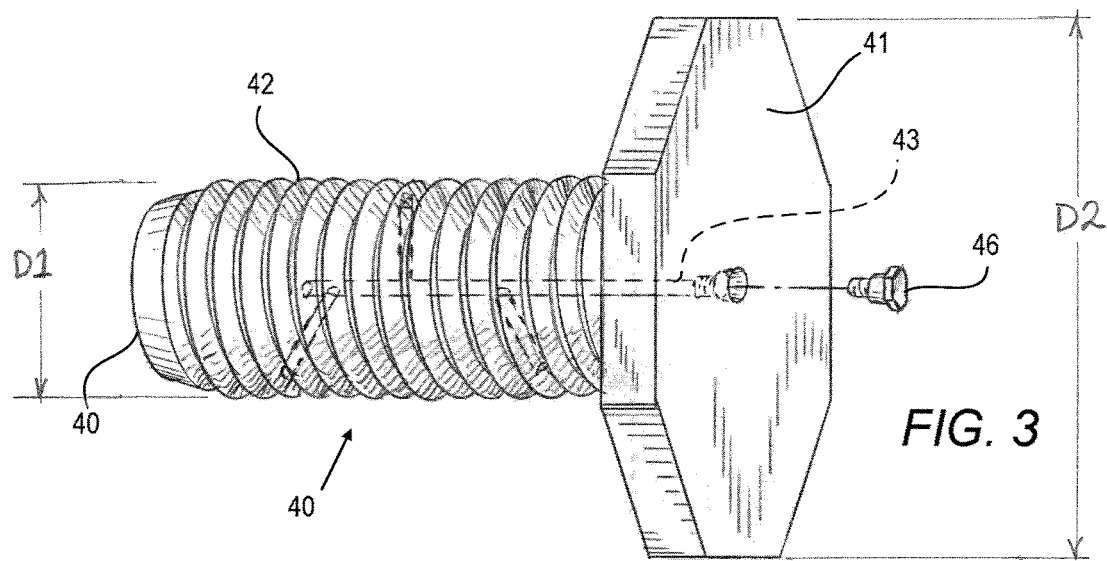

REPLACEMENT TUBE PLUG FOR HEAT EXCHANGER

I. FIELD OF THE INVENTION

This invention pertains to damage and leakage at the threaded junction of a tube plug and a plugsheet of a heat exchanger, particularly when tube plugs are removed during maintenance of air cooled heat exchangers (ACHEs), and pertains to a method for solving this thread damage problem in remote locations in the field.

II. BACKGROUND AND PRIOR ART

Heat exchangers such as air cooled heat exchangers (ACHEs) and other heat exchangers operating continuously and often at elevated temperatures, sometimes develop leaks in heat exchange tubes or at junctions of ends of heat exchange tubes with a tubesheet or at junctions of tube plugs in plugsheets. During maintenance, cleaning, inspection, repair and/or upgrade functions, forcible removal of tube plugs often results in serious damage to threads in plugsheets and/or tubes. This damage to threaded surfaces occurs often due to galling of adjacent contacting threaded surfaces where surface material is damaged or even removed.

Prior art includes various tube plugs with internal ducts for fluid sealant as listed below; however, none indicate any awareness of the problem or present solution for damaged threads in plugsheet and/or in heat exchange tube apertures in ACHEs in remote locations with normal repair apparatus being unavailable and a severe need for a quick and feasible solution to avoid lengthy and costly shutdowns: U.S. Pat. Nos. 3,240,379; 3,434,743; 3,472,301; 4,114,654; 5,249,899; 6,588,999; 6,604,899; 6,896,462; 6,902,366; 8,439,220; 2004/0109738; and JP 1993-087488.

III. OBJECTS AND SUMMARY OF THE NEW INVENTION

The present invention addresses certain problems that occur in maintenance, inspection and repair of heat exchangers and particularly the problem of damaged threads of tube plugs and plugsheets when the tube plugs are forcibly removed.

One object of this invention is to provide a relatively swift and feasible solution to leakage where threads of a plugsheet and/or of a tube plug are damaged, and particularly where thread damage occurs in heat exchangers in remote locations where comprehensive repair apparatus and replacement parts are not available.

One device to address the above leakage problem is to form a conventional solid tube plug into a replacement tube plug having internal passageways for delivery of a fluid sealant to damaged threads of tube plugs and mating threaded holes in plugsheets By the present invention a replacement tube plug may have a central bore extending less than the length of the tube plug and axially spaced branch bores extending radially to outer threaded surfaces of the tube plug. The central bore and branch bores provide passageways for a fluid sealant material to be directed through the tube plug to the regions of the threads of the tube plug and of the plugsheet. A threaded screw or other closure means will close the central passageway after fluid sealant is directed through the tube plug to the threaded region.

A still further object is to provide a method for modifying a standard solid threaded tube plug into a replacement sealing tube plug by drilling in the standard plug a central passage with radial branch passages extending to the threads. A threaded cap closes the central bore, this method of modifying a standard tube plug being feasible with minimal equipment in remote locations the field.

An exemplary replacement tube plug for sealing a threaded plug-to-plugsheet junction comprises:

a. a body part having length between proximal and distal ends and a threaded outer surface, b. a main internal passageway extending generally axially from said proximal end distally a distance less than the length of said body part, c. at least one branch passageway in fluid communication with said main passageway and extending radially outward to and through said outer threaded surface, thereby defining a continuous passageway open at said proximal end of said body part and open at said threaded outer surface of said body part, and d. a cap positionable to close said proximal end opening of said main passageway.

A further exemplary embodiment is a tube plug wherein said at least one branch passageway comprises a plurality of branch passageways that are axially spaced apart relative to each other lengthwise of said body part.

A still further exemplary embodiment is a tube plug wherein said at least one branch passageway comprises a plurality of passageways which extend in different outward directions circumferentially spaced from each other.

In the above-described tube plug said at least one branch passageway may comprise a plurality of branch passageways which are axially spaced apart from each other lengthwise of said body part and which extend in different outward directions circumferentially spaced from each other.

Another exemplary embodiment is a tube plug wherein said at least one branch passageway comprises:

(i) a first branch passageway, (ii) a second branch axially spaced apart from said first branch passageway, and (iii) the third branch passageway axially spaced from both said first and second branches, where all three branch passageways are circumferentially spaced apart 120° from the each other.

A still further exemplary embodiment is a tube plug wherein said main passageway is situated centrally of said body part, and said at least one branch passageway extends radially outward at an angle about 90° from said main passageway.

The present invention further includes a method of converting a standard solid externally threaded tube plug having proximal and distal ends along its length, into a replacement tube plug adapted to deliver fluid sealant to the region of mating threads between said tube plug threaded into a tubesheet, comprising the steps:

a. drilling a central bore hole axially through said proximal end in said solid tube plug in the distal direction a distance less than the length of said solid tube plug, b. drilling at least one branch duct radially inward from said outer surface threaded region to intersect said central bore hole, thereby defining a continuous passageway open at said proximal end of said body part and open at said threaded outer surface, and c. forming threads at said proximal end of said central bore hole to receive a screw to close and seal said proximal end of said bore hole.

The present invention further includes a method of directing fluid sealant to the region of mating threads between a tube plug screwed into a bore of a plugsheet by modifying a standard solid tube plug which has proximal and distal ends, comprising the steps:

a. forming threads in said bore of said plugsheet corresponding to the external threads on said tube plug,
b. drilling in said solid tube plug a central internal passageway extending from the proximal end and a distal direction a distance less than the length of said tube plug,
c. drilling at least one branch duct from said outer thread region radially inward to and intersecting said central internal passageway, and
d. forming threads in the proximal end of said central passageway adapted to receive a screw to close said passageway.

In the above method, drilling said at least one branch duct comprises drilling three branch passageways axially spaced apart lengthwise of said tube plug body part and circumferentially spaced apart each from the others.

The present invention thus includes a method of sealing the open end of an aperture in a plugsheet with a solid tube plug having a body part with proximal and distal ends, comprising:

a. forming threads in said aperture,
b. forming mating external threads on the outer surface of said body part of a tube plug, and
c. forming in said tube plug an internal passageway extending from the plug's proximal end opening distally a distance less than the length of said body part, forming branch passageways from said internal passageway radially outward to the threads. In regard to the invention described herein the branch passageways have been described as extending radially, but they may take any path from the main passageway to the external thread region. Also, the main passageway may be other than central.

These and other advantages of the invention will be further understood and appreciated by those skilled in the art by reference to the following written specification, claims and appended drawings.

IV. BRIEF DESCRIPTION OF THE DRAWINGS

Figure 4:
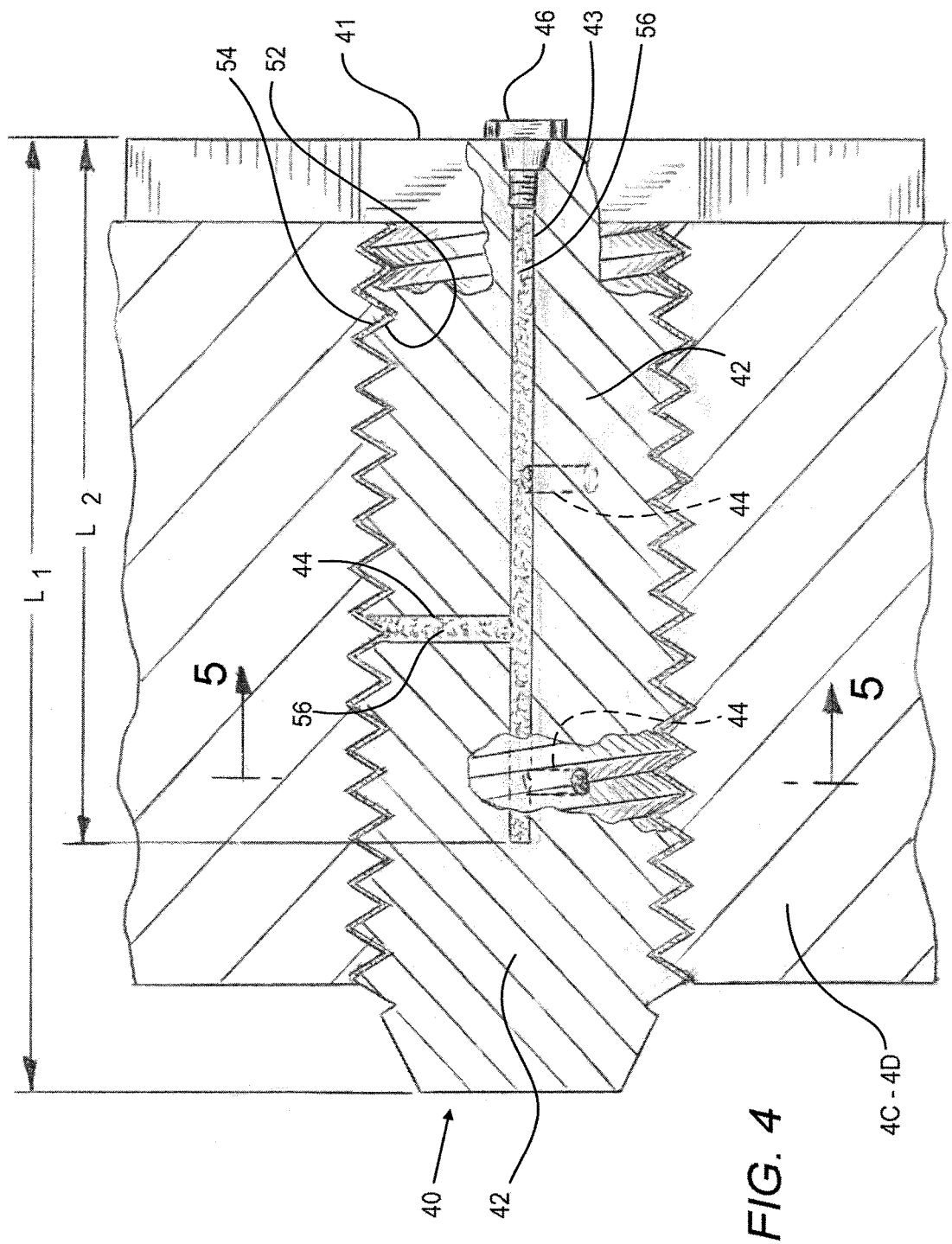
Figure 5:
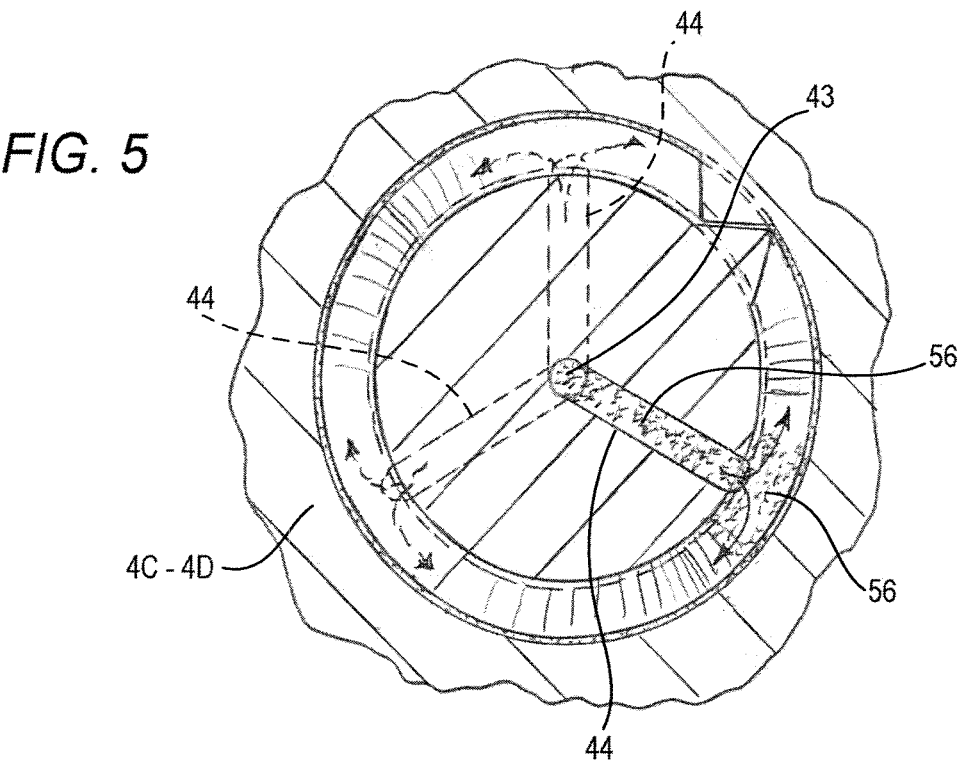
Figure 6:
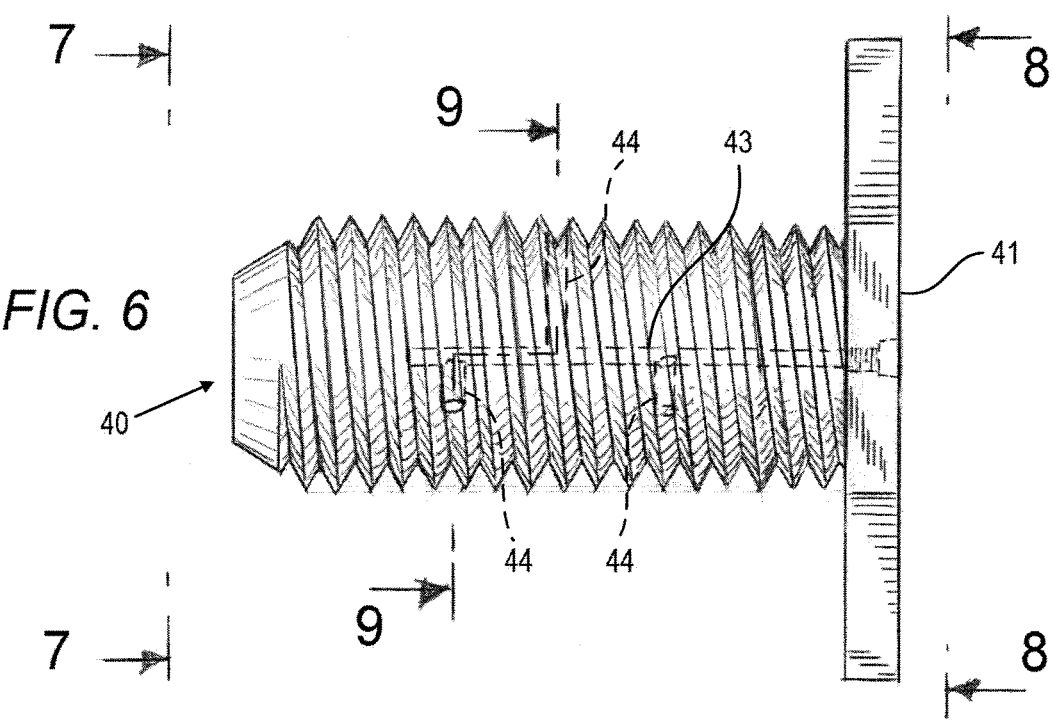
Figures 7, 8, 9:
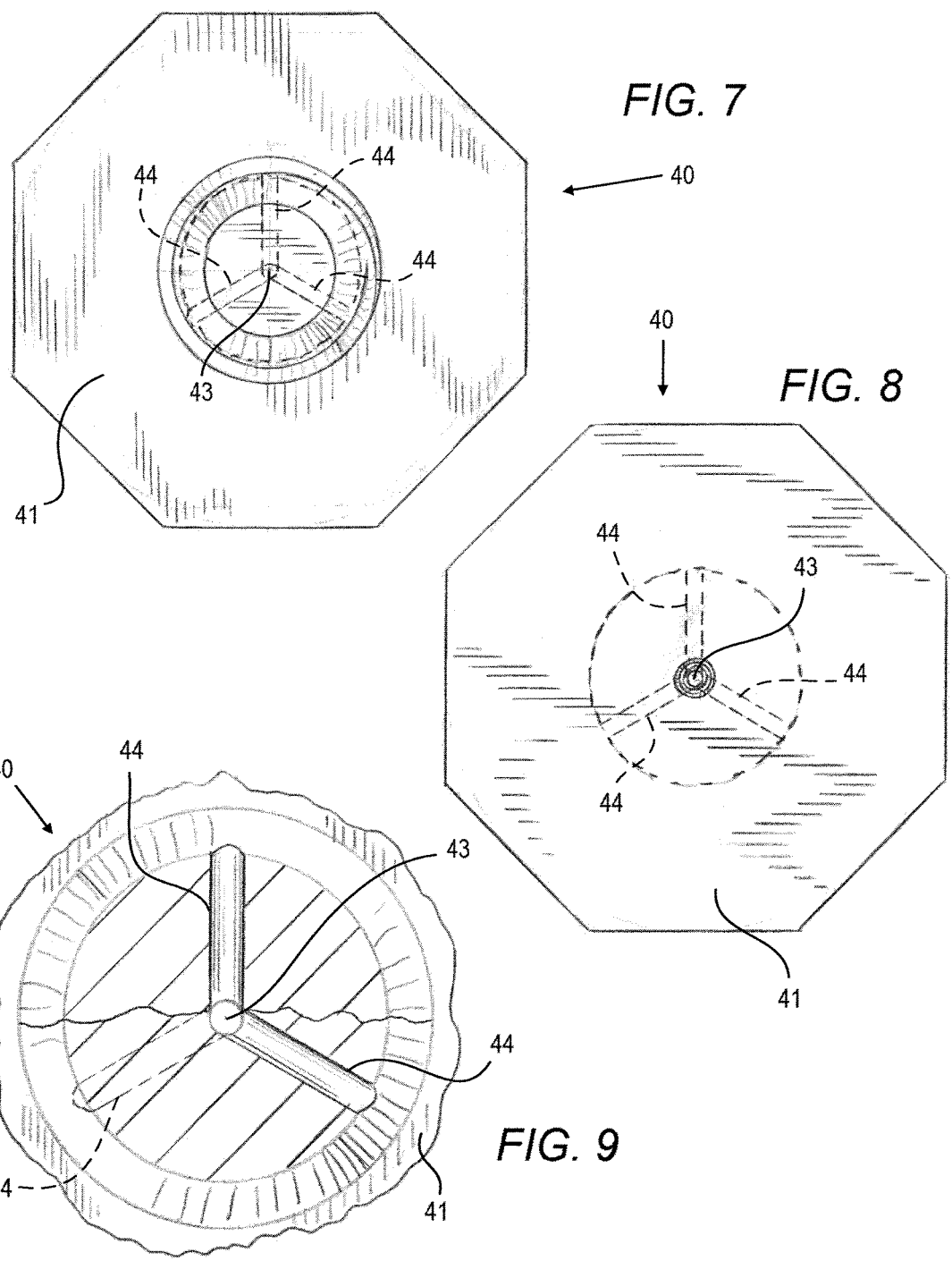

FIG. 1 is and elevation view of a prior art he exchanger installation,
FIG. 2 is an enlarged fragmentary view of a prior art tube plug installed in a plugsheet of FIG. 1,
FIG. 3 is a perspective view showing the new tube plug,
FIG. 4 is a fragmentary elevation view in section showing the new tube plug installed in a plugsheet,
FIG. 5 is a sectional view taken along line 5-5 in FIG. 4 showing central and radial passageways in the tube plug,
FIG. 6 is a side elevation view of the new tube plug,
FIG. 7 is a distal end elevation view thereof,
FIG. 8 is a proximal end elevation view thereof, and
FIG. 9 is a sectional view taken along line 9-9 in FIG. 6 showing internal central and radial passageways.

Features of the invention will become apparent from the following description of the exemplary embodiments taken in conjunction with the accompanying drawings.

V. DETAILED DESCRIPTION OF THE PREFERRED EMBODIMENTS

For convenience and clarity in describing these embodiments, similar elements or components appearing in different Figures will have the same reference numbers.

FIG. 1 shows schematically a prior art air cooled heat exchanger (ACHE) 1 with multiple rows of heat exchange tubes 2A, 2B, 2C, etc., having fins 3 along their length. These heat exchange tubes extend between the opposite tubesheets 4A, 4B which are supported in frame 6. The ends 10 of the heat exchange tubes are mounted in the tubesheets 4A, 4B, and are in fluid communication indicated by arrows 5 with inlet and outlet manifolds (headers) 8A, 8B respectively. Outward of tubesheets 4A, 4B are plugsheets 4C, 4D. The finned outer surfaces of the respective heat exchange tubes are exposed to ambient air which may move by natural convection or may be exposed to forced air flow indicated by arrow 14 (fans or blowers not shown).

FIG. 2 is a fragmentary enlarged view of a prior art tube plug 20 whose outer surface 22 is threaded and engages mating threads 24 in the aperture 26 in plugsheet 4C. Damage to threads 24 on tube plug 20 or threads 26 in plugsheet 4C are the principal subject of the present invention, as it is these threads which become damaged when a tube plug 20 is forcibly removed for maintenance or other purposes. Threaded surfaces often become galled and may be seriously damaged when removed, such that they can longer provide a fluid tight seal when re-installed.

FIGS. 3-9 illustrate a new tube plug 40 of the present invention which has head or flange 41, stem or body 42 and central passageway 43. As seen in FIG. 4 tube plug 40 has length L2 of passageway 43 less than the total length L1 of the tube plug and diameter D1 of body 42 less than diameter D2 of tube plug head 41. FIGS. 4, 5 and 7-9 illustrate how branch passageways 44 intersect central passageway 43 and extend radially outward to the threaded region. FIG. 4 also shows how the three passageways 44 are axially spaced apart along the length of the tube plug stem or body part 42. FIGS. 5 and 7-9 show how passageways 44 are displaced 120° circumferentially from each other. These branch passageways 44 as illustrated, extend at 90° from central passageway 43, but they may extend at other angles or along other paths. This array of branch passageways allows a wide distribution area of fluid sealant 56 along and around the threads to achieve a reliable seal. Many commercial sealants are available, one example being a product sold under the label "XX Heavy Sealant #5050" by Sealweld Corporation, Calgary, Alberta, Calif. Tube plug threads 52 engaged plugsheet threads 54, and sealant 56 as shown is forced into areas of damaged threads; however, sealant will not flow into regions of undamaged and tight thread engagement.

Also seen in FIG. 4, after the sealant 50 is injected through central passageway 43, cap screw 46 is threaded into the proximal end of passageway 43 to block escape of sealant and to block inlet of debris. Screw 46 may serve the additional purpose when screwed end, of pushing or compressing sealant 43 to flow in central passageway 28 and thence out through branch passages 44. Central passageway 43 has generally uniform cross-sectional diameter along its length as seen in the Drawings in FIGS. 3, 4, 5 and 6 which designate central passageway 43 and is described in the specification.

While the invention has been described in conjunction with several embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

The invention claimed is:

1. A tube plug for sealing a threaded plug-to-plugsheet junction with fluid sealant from a source external of said tube plug, said tube plug comprising:
   a. a body part having length between proximal and distal ends and a threaded outer surface,
   b. a main internal passageway having an entranced opening having an internal thread in said proximal end in said body part and extending generally axially from the threaded opening in said proximal end distally a distance less than the length of said body part,
   c. at least one branch passageway in said body part in fluid communication with said main passageway and extending outwardly to and through said outer threaded surface, thereby defining a continuous open and unobstructed passageway open at said proximal end entrance to said body part and open at said threaded outer surface of said body part, and
   d. a cap having an outer thread cooperating with said internal thread of said entrance opening to close said entrance opening of said main passageway after said fluid sealant has been injected into and through said main passageway.

2. The tube plug according to claim 1, wherein said at least one branch passageway comprises a plurality of branch passageways that are axially spaced apart relative to each other lengthwise of said body part.

3. The tube plug according to claim 1, wherein said at least one branch passageway comprises a plurality of branch passageways which extend from said main internal passageway in different outward directions circumferentially spaced from each other.

4. The tube plug according to claim 1, wherein said body part has a maximum outer diameter D1 along its length, and further comprises a head part integral with said proximal end of said body part and having diameter D2 greater than said diameter D1.

5. A method of converting a standard solid externally threaded tube plug having a body part with proximal and distal ends and an outer surface between said ends and configured to be a replacement tube plug configured to allow delivery of fluid sealant to flow into the region of mating threads between said tube plug threaded into a plugsheet, comprising the steps of:
   a. in said body part, forming a central bore hole axially through said proximal end in the distal direction a distance less than the length of said solid tube plug,
   b. forming at least one branch duct radially inward from said outer surface threaded region to intersect said central bore hole, thereby defining a continuous open passageway open at said proximal end of said body part and open at said threaded outer surface, and
   c. providing a closure structure to close and seal said proximal end of said central bore hole, wherein providing the closure structure comprises forming threads at said proximal end of said central bore hole to receive a threaded cap to close and seal aid open proximal end of aid central bore hole.

6. The method according to claim 5, wherein forming said at least one branch duct comprises forming three branch passageways axially spaced apart lengthwise of said tube plug body part and circumferentially spaced apart each from the others and extending inwardly from said outer surface to intersect said central bore hole.

7. A method of directing fluid sealant to the region of mating threads between a tube plug screwed into a threaded bore of a plugsheet, the method comprising the steps of:
   a. screwing said tube plug into the bore of the plugsheet, the tube plug including (i) a body part having length between proximal and distal ends and (ii) a threaded outer surface, said proximal end being open for receiving fluid sealant, (iii) thus defining a main internal passageway extending generally axially from said proximal end distally a distance less than the length of said body part, (iv) at least one branch passageway in fluid communication with said main passageway and extending outward to and through said threaded outer surface as an outlet, (v) thereby defining a continuous open passageway open at said proximal end of said body part and open at said threaded outer surface of said body part, and (vi) a cap positionable to close said proximal end opening of said main passageway,
   b. injecting a fluid sealant into said open proximal end of said body part and through said main internal passageway and through said at least one branch passageway to said region of mating threads between said tube plug and the threaded bore of said plug sheet, and
   c. closing said main passageway at the open proximal end thereof, wherein said closing of said main passageway at the open proximal end comprises forming internal screw threads in said proximal end and screwing a cap screw into said internal screw threads in the proximal end of said main passageway after the injection of the fluid sealant.

8. The method according to claim 5, wherein said forming of the at least one branch duct comprises drilling said at least one branch duct radially inward from said outer surface threaded region to intersect said central bore hole.

9. The tube plug according to claim 1, wherein said main internal passageway has a generally uniform diameter along its length.

10. The method according to claim 7, wherein said main internal passageway has a generally uniform diameter bore along its length.

* * * * *